United States Patent
Park

[19]

[11] Patent Number: 6,021,484
[45] Date of Patent: Feb. 1, 2000

[54] DUAL INSTRUCTION SET ARCHITECTURE

[75] Inventor: Sung Bae Park, Gunpo, Rep. of Korea

[73] Assignee: Samsung Electronics Co., Ltd., Rep. of Korea

[21] Appl. No.: 08/970,898

[22] Filed: Nov. 14, 1997

[51] Int. Cl.[7] .............................. G06F 9/30; G06F 9/40; G06F 9/41; G06F 9/455
[52] U.S. Cl. .............................. 712/41; 712/209; 712/23
[58] Field of Search ............................ 711/207, 129, 711/201; 712/204, 41, 200, 210, 209, 43, 208, 218, 23

[56] References Cited

U.S. PATENT DOCUMENTS

| | | | |
|---|---|---|---|
| 5,307,504 | 4/1994 | Robinson et al. | 364/DIG. 2 |
| 5,438,668 | 8/1995 | Coon et al. | 195/390 |
| 5,598,546 | 1/1997 | Blomgren | 395/385 |
| 5,638,525 | 6/1997 | Hammond et al. | 395/385 |
| 5,666,497 | 9/1997 | Milhaupt et al. | 710/129 |

FOREIGN PATENT DOCUMENTS

WO96/24895  8/1996  WIPO .

OTHER PUBLICATIONS

Christy, Peter "IA–I and Merced—What and Why?" Microdesign Resources, Dec. 30, 1996, Microprocessor Report, pp. 17–19.

Gwennap, Linley, "First Merced Patent Surfaces", Microdesign Resources, Mar. 31, 1996, Microprocessor Report, pp. 16–18.

*Primary Examiner*—Daniel H. Pan
*Attorney, Agent, or Firm*—Samuels, Gauthier & Stevens LLP

[57] ABSTRACT

A system and method for executing CISC instructions in a RISC environment are disclosed. A mapper/interface circuit receives CISC instructions which can be from an x86 instruction set, translates them into compatible RISC instructions and forwards them to a RISC microprocessor for execution. The interface circuit is separate from the RISC microprocessor resulting in off-chip hardware translation which improves microprocessor efficiency and simplifies processor and hardware development. The instructions can be translated in groups which are defined by boundaries in the CISC instructions. One group of instructions can be forwarded to the microprocessor for execution while a subsequent group is simultaneously translated. The plug-in mapper/interface circuitry of the invention is plug compatible with an x86 processor such that the circuitry of the invention can be plugged into a standard x86 socket in a standard x86 mother board. Since standard commercially available components can be used as the host, considerable cost savings in system development and manufacture are realized.

60 Claims, 10 Drawing Sheets

DUAL INSTRUCTION SET ARCHITECTURE

BACKGROUND OF THE INVENTION

Processing systems typically include a microprocessor, associated memory, control, interface and other circuitry and peripheral systems such as a data/address/control bus, a bus interface, external memory devices such as disk and/or CD ROM, and a user interface system including keyboard, mouse, display, etc., along with associated interface circuitry including additional memory, device drivers, etc. Conventionally, each processing system is associated with and is designed to operate with its own unique set of program instructions, and each instruction set is specifically designed to be executed by its associated microprocessor.

Today, the personal computer market is dominated by systems that include one of the Intel family of microprocessors, which includes the 286, 386, 486 and Pentium™ microprocessors, manufactured by Intel Corporation of Santa Clara, Calif. These microprocessors execute an x86 instruction set and are therefore considered complex instruction set computer (CISC) processors. As the name suggests, the x86 instruction set is characterized by a large number of complicated instructions which can be difficult for microprocessors to decode and also can be relatively slow to execute, in comparison with simpler instruction sets.

In an effort to improve processing speed, some manufacturers have developed reduced instruction set computer (RISC) processors. These processors execute instructions from a RISC instruction set which is substantially simplified compared to the x86 CISC instruction set. In a typical RISC instruction set, such as the instruction set designed to operate with the alpha microprocessor manufactured by Digital Equipment Corporation of Maynard, Mass., multiple steps of an operation, each of which would have its own instruction in a CISC system, are divided into many RISC instructions. This results in greatly improved program compile and execution speed.

Despite the improvements in efficiency realized by RISC processors, they have been slow to break into the personal computer market, since the x86 processors have become the de facto standard. Most of the available system hardware has been standardized to work with the dominant x86 processors. Supporting hardware such as x86 mother boards are being mass produced at very low cost. Meanwhile, RISC mother boards and other hardware, which must be customized to the particular microprocessor since not many standards exist, can be several times more expensive to produce than their x86 CISC counterparts.

Also, most of the available software, including applications and operating systems such as Windows95™ by Microsoft Corporation of Redmond, Wash., was developed to be compatible only with the x86 CISC instruction set. Therefore, even if the hardware issues could be successfully addressed, software compatibility would remain a major obstacle to RISC systems.

It has been proposed to overcome these problems by using a RISC processor to operate from a CISC instruction set, particularly the x86 instruction set. For example, in developing its next generation "Merced" microprocessor with Hewlett-Packard Company of Palo Alto, Calif., Intel has described in U.S. Pat. No. 5,638,525, entitled "Processor Capable of Executing Programs that Contain RISC and CISC Instructions," an entirely new RISC microprocessor which is capable of executing x86 instructions. In one configuration, the microprocessor has been redesigned to include on-chip translation circuitry which translates an x86 instruction to an associated RISC instruction. A new on-chip "execution unit" then executes the translated RISC instruction. Exponential Technology, Inc. of San Jose, Calif. also describes a redesigned RISC microprocessor with on-chip CISC and RISC instruction decoding and execution in addition to on-chip CISC instruction emulation in U.S. Pat. No. 5,598,546, entitled "Dual-Architecture Super-Scalar Pipeline."

Digital Equipment Corporation (DEC) has developed an instruction translator in software. DEC's FX!32 software can translate x86 instructions to RISC instructions for execution by its Alpha™ RISC microprocessor.

These prior approaches have certain drawbacks that can cause inefficiencies in system development and operation. For example, both the Intel and Exponential Technology systems use extensive custom circuitry on the microprocessor chip to perform required operations to accommodate execution of x86 instructions. These operations can include translation from CISC instructions to RISC instructions as well as RISC and CISC instruction decoding and execution. The required circuitry is extremely large and complex and can therefore be difficult to develop and implement. Such increased overall processor chip complexity can result in a microprocessor that can be difficult and, therefore, expensive, to manufacture. It can also suffer from high error rates and reduced reliability. Furthermore, because more processing is done on-chip, the overall microprocessor processing efficiency can be substantially reduced.

The DEC software approach can also be inefficient. As with other computing functions, the x86 processing functions, including instruction translation, decoding and execution, can be performed more quickly in hardware than in software. A hardware approach is in general more efficient in terms of total processing load and, consequently, the microprocessor efficiency, than a software approach.

SUMMARY OF THE INVENTION

The present invention is directed to a processing system and method and an interface circuit, or mapping circuit, which overcome the drawbacks of the prior art. In one aspect, the system of the invention includes the interface circuit which is separate from a microprocessor integrated circuit of the system and which provides an interface to the separate microprocessor integrated circuit. The microprocessor can execute instructions of a first instruction set. The interface circuit includes an input interface which receives instructions of a second instruction set. A translator circuit in the interface circuit receives these instructions and translates them into associated instructions of the first instruction set. The translated instructions of the first instruction set are then transferred over an output interface to the separate microprocessor integrated circuit. The instruction sets can be in the form of object codes.

In one embodiment, the microprocessor integrated circuit is a RISC microprocessor, such as DEC's alpha microprocessor, and the first instruction set is a RISC instruction set, which can be the RISC instruction set used with the alpha microprocessor. The second instruction set can be a CISC instruction set and, in one embodiment, can be an x86 instruction set. In this embodiment, x86 instructions are received and translated by the interface circuit of the invention to RISC instructions which are then forwarded to the RISC microprocessor for execution.

In one embodiment, the interface circuit of the invention includes an instruction queue, or CISC queue or x86 queue, which temporarily stores the instructions of the second instruction set before they are translated. The instructions to be translated can be forwarded to the translator in groups to provide additional system efficiency. An analyzer circuit can be included to analyze the instructions as they are stored in the instruction queue to identify boundaries of a group of instructions to be sent to the translator circuit. These group boundaries are typically determined by a beginning and end statements of one or more execution loops.

After a group of instructions is identified for translation, the group can be sent to the translator circuit. The resulting group of translated instructions can be forwarded from the translator to a second translated instruction queue, or RISC queue, in the interface circuit of the invention. This second instruction queue stores translated RISC instructions before they are forwarded over an output interface to the RISC microprocessor for execution. When the entire group of CISC instructions has been translated and the associated translated RISC instructions have all been stored in the second instruction queue, the group of translated instructions can be transferred over the output interface to the RISC microprocessor for execution.

In one embodiment, the interface circuit of the invention is used in connection with standard CISC hardware, which, in one particular embodiment, can be standard x86 hardware including a standard x86 mother board. The x86 instructions are received via the standard mother board at the input interface which forwards the x86 instructions to x86 instruction queue of the invention, which stores them for translation.

As one group of instructions is executed by the RISC microprocessor, a second group of x86 instructions can be simultaneously loaded into the x86 instruction queue, analyzed, translated to a second group of RISC instructions, and loaded into the RISC queue. Thus, system efficiency is greatly improved by translating a second set of instructions while a first set of instructions is being executed. Idle waiting times can be substantially reduced.

It is known that the address bus, data bus, and control bus configurations for x86 systems are different than those for RISC processors. To account for and correct this incompatibility, the interface circuit of the invention also includes mapping circuitry which translates x86 or CISC instruction formats, including address, data, and control signals, into associated formats which allow proper execution of the translated RISC instructions on the RISC microprocessor. In one embodiment, the interface circuit includes separate control mapper, address mapper, and data mapper circuits.

In another aspect, the invention is directed to a processing system and method and an interface circuit or mapping circuit which are configured such that the microprocessor compatible with instructions of the first instruction set and the interface circuit and any other associated circuitry are physically compatible with the standard hardware of the microprocessor of the first instruction set. That is, the microprocessor of the first instruction set and the interface and associated circuitry are fabricated so as to be plug-compatible with the microprocessor of the second instruction set. As a result, the microprocessor of the second instruction set can be removed from its socket and replaced with the plug-compatible circuitry of the invention. The interface circuitry of the invention provides the appropriate mapping between the microprocessor of the first instruction set and the host system for the microprocessor of the second instruction set. This enables standard commercially available hardware of the second instruction set to be used without modification in the system of the invention with the microprocessor of the first instruction set.

For example, in one embodiment, the microprocessor which executes instructions of the first instruction set is a RISC microprocessor such as the DEC Alpha microprocessor, and the first instruction set is the associated RISC instruction set used with the Alpha microprocessor. The second instruction set can be a CISC instruction set and, in one embodiment, can be an x86 instruction set. In this embodiment, the x86 microprocessor can be removed from its socket on the standard x86 mother board. The circuitry of the invention, which includes at least the Alpha microprocessor, the interface or mapping circuitry of the invention and a standard RISC (Alpha) bus, is plugged into the open x86 socket and can be used to execute the system x86 instructions.

In one embodiment, the circuitry of the invention which includes at least the RISC (Alpha) microprocessor, the interface circuitry of the invention and the RISC (Alpha) bus, is fabricated on a small printed circuit board (PCB) with pins on its underside that mate with the standard x86 microprocessor socket. In another embodiment, the circuitry of the invention is provided on a multichip module (MCM) which also includes pins on its underside configured to mate with the standard x86 microprocessor socket.

In one embodiment, the interface or mapping circuit provides bus mapping between systems, but not architecture mapping. As a result, the circuit of the invention, including the RISC system components, is plug or pin or bus compatible with the CISC x86 system, but is not binary compatible with the x86 system. That is, the interface or mapping circuit in the circuitry of the invention maps only the hardware pin-outs of the RISC (Alpha) processor to those of the x86 microprocessor system. In this case, even though the pins of the RISC system are mapped to the x86 hardware, the instruction and data formats are not translated. As a result, they cannot be decoded or processed without some additional processing. In this embodiment, a software emulation approach is applied to translate instructions and data from the x86 format to the Alpha format to allow execution of the instructions. In this case, the software emulation program can be stored in one of the system storage media such as the hard disk or CD ROM.

In another embodiment, the interface or mapping circuit provides bus mapping as well as architecture mapping between the RISC Alpha microprocessor system on the plug-in circuit of the invention and the x86 system. In this case, the circuitry of the invention is considered both plug-compatible and binary-compatible with the host x86 hardware. As a result, instructions, data and control signals transferred between the circuitry of the invention and the x86 hardware can be processed without the need for extensive emulation software. The instructions are translated from CISC (x86) compatible format to RISC (Alpha) format as described above such that execution of the instructions can be readily performed by the RISC (Alpha) microprocessor.

In another embodiment, the plug-in circuit of the invention includes the RISC (Alpha) microprocessor, the RISC bus and the mapper/interface circuitry, which includes an x86 core ASIC microprocessor as well as bus mapping circuitry and architecture mapping circuitry. In this embodiment, the x86 core microprocessor is used to directly execute simpler x86 instructions. In the case of relatively simple, e.g., 8-bit or 16-bit, applications, direct execution by the x86 core ASIC is more efficient than translating the instructions to RISC instructions and then executing the translated instructions on the RISC microprocessor. In this embodiment, for the more performance driven, e.g., 32-bit, applications, such as those executed in the x86 protected mode, the architecture mapping circuitry performs instruction translation as described above such that the instructions can be executed by the RISC microprocessor. The interface circuitry of the invention also includes the bus mapping capability such that the RISC system and mapper/interface circuitry is bus-to-bus compatible with the host x86 system.

In another embodiment, the CISC or x86 processor plugs into the top of the plug-in circuit of the invention which in turn plugs into the x86 socket on the mother board in the host x86 system. That is, the plug-in circuit of the invention is placed into the x86 socket between the x86 mother board and the x86 processor. In this embodiment, the circuit of the invention includes the RISC (Alpha) microprocessor, the RISC bus and the mapper/interface circuitry of the invention. These circuits can be mounted on a PCB or MCM as described above. The PCB or MCM also includes a pattern of pin sockets which are compatible with the x86 microprocessor pins such that the x86 processor can be plugged into the PCB or MCM of the invention. In one embodiment, the x86 microprocessor pin connectors are routed directly through the circuit of the invention to the x86 host mother board without any intervening mapping or other processing being performed.

In this embodiment, CISC (x86) instructions can be executed directly by the x86 microprocessor. Alternatively, the CISC instructions can be translated by the mapping/interface circuitry of the invention into RISC instructions such that they can then be executed by the RISC (Alpha) microprocessor. As in the previously described embodiment, certain relatively simple, e.g., 8-bit or 16-bit, applications can be executed by the x86 microprocessor. The more performance driven applications, such as those executed in the x86 protected mode, can be translated by the mapping/interface circuitry of the invention and then executed by the RISC microprocessor. In this embodiment, the interface circuit of the invention includes bus mapping such that the RISC (Alpha) microprocessor system and the host CISC (x86) system are bus-to-bus compatible. Architecture mapping is also included such that the RISC system and x86 host system are also binary compatible.

The various aspects of the invention provide numerous advantages over prior approaches. For example, because the present invention is implemented in hardware, it provides much more efficient translation and mapping than approaches which only use software, such as DEC's FX!32 software. Furthermore, because the hardware of the invention is provided off-chip, rather than on the microprocessor chip, circuit complexity of the microprocessor is greatly reduced, resulting in greatly improved microprocessor development, fabrication and operation efficiency. With the interface hardware off the microprocessor chip, the circuit complexity and processing load of the microprocessor is greatly reduced, allowing for more efficient processor operation. Also, because it is plug-in compatible with existing x86 standard hardware, the circuit of the invention is relatively inexpensive to implement in host systems, since the x86 standard hardware is readily available and also relatively inexpensive.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
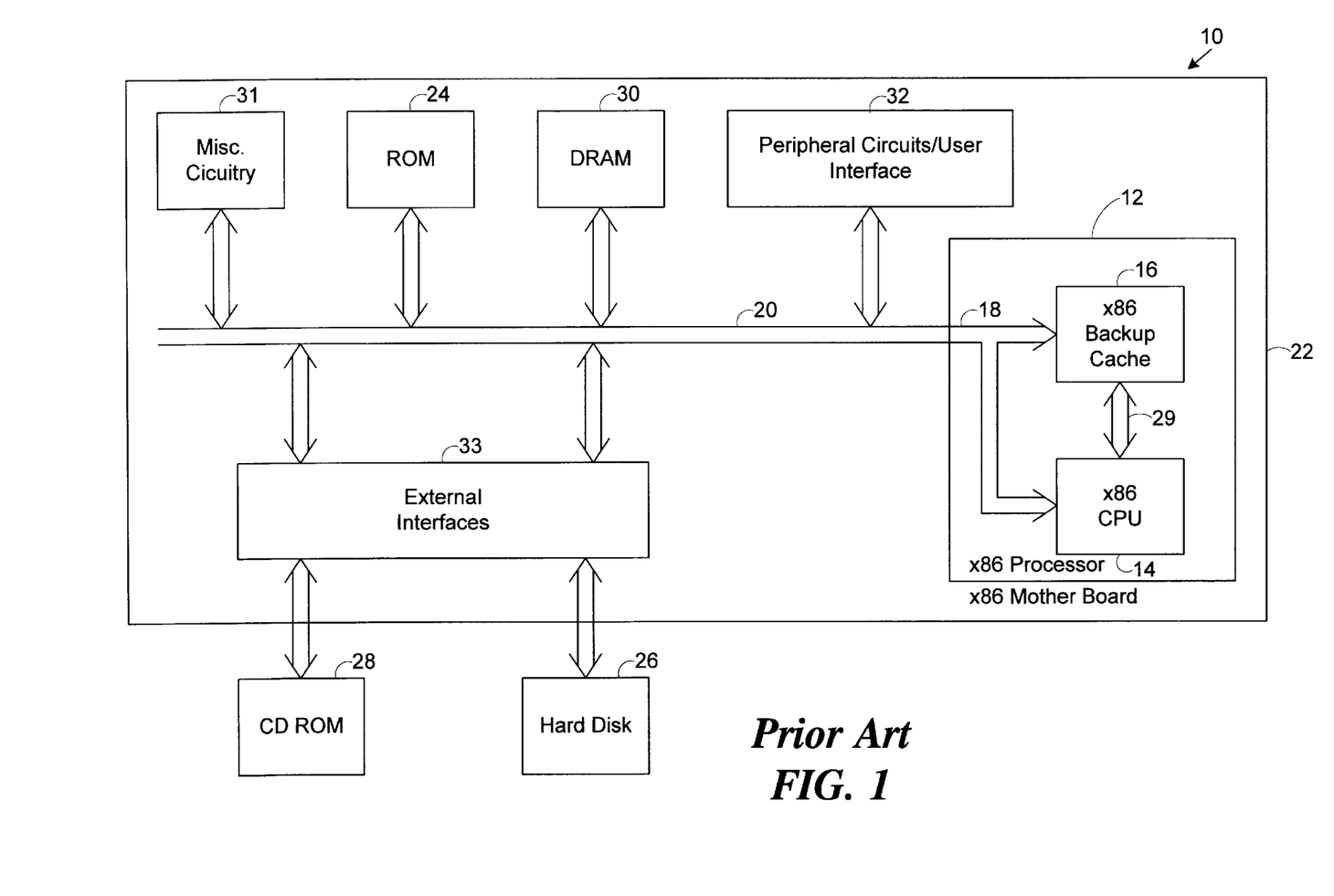
FIG. 1 is a schematic functional block diagram of the functional architecture of a prior art CISC x86 processing system.

FIG. 1 is a schematic functional block diagram of the functional architecture of a standard CISC processing system 10 which is shown as an x86 system. The system 10 includes an x86 microprocessor 12 which executes instructions from an x86-compatible instruction set. The x86 processor 12 can include at least an x86 CPU 14, an x86 backup cache memory 16 and an internal x86 bus 18 and is mounted on a standard x86 mother board 22. The internal x86 bus 18 is interfaced to the system x86 bus 20, which connects the processor 12 to other hardware on the mother board 22 and external hardware such as a CD ROM drive 28 and a hard disk drive 26, via external interfaces 33. The other mother board hardware can include a ROM 24 which can store the system BIOS (Basic Input/Output System), DRAM memory 30, peripheral circuits 32 which provide, among other items, a user interface to such devices as a display, keyboard, mouse, etc., and other miscellaneous circuitry 31 which can include graphics chips and/or other circuits.

In operation, CISC x86 instructions to be executed are read from one or more of the memory devices 26, 28, 30 and are forwarded over the x86 bus 20 to the x86 processor 12 for execution. The instructions can be stored temporarily in the x86 backup cache 16. The x86 CPU 14 can read the instructions from the cache 16 as they are executed. The instructions can be forwarded to the x86 CPU 14 over the internal x86 bus 18 or over an instruction bus 29.

Figure 2:
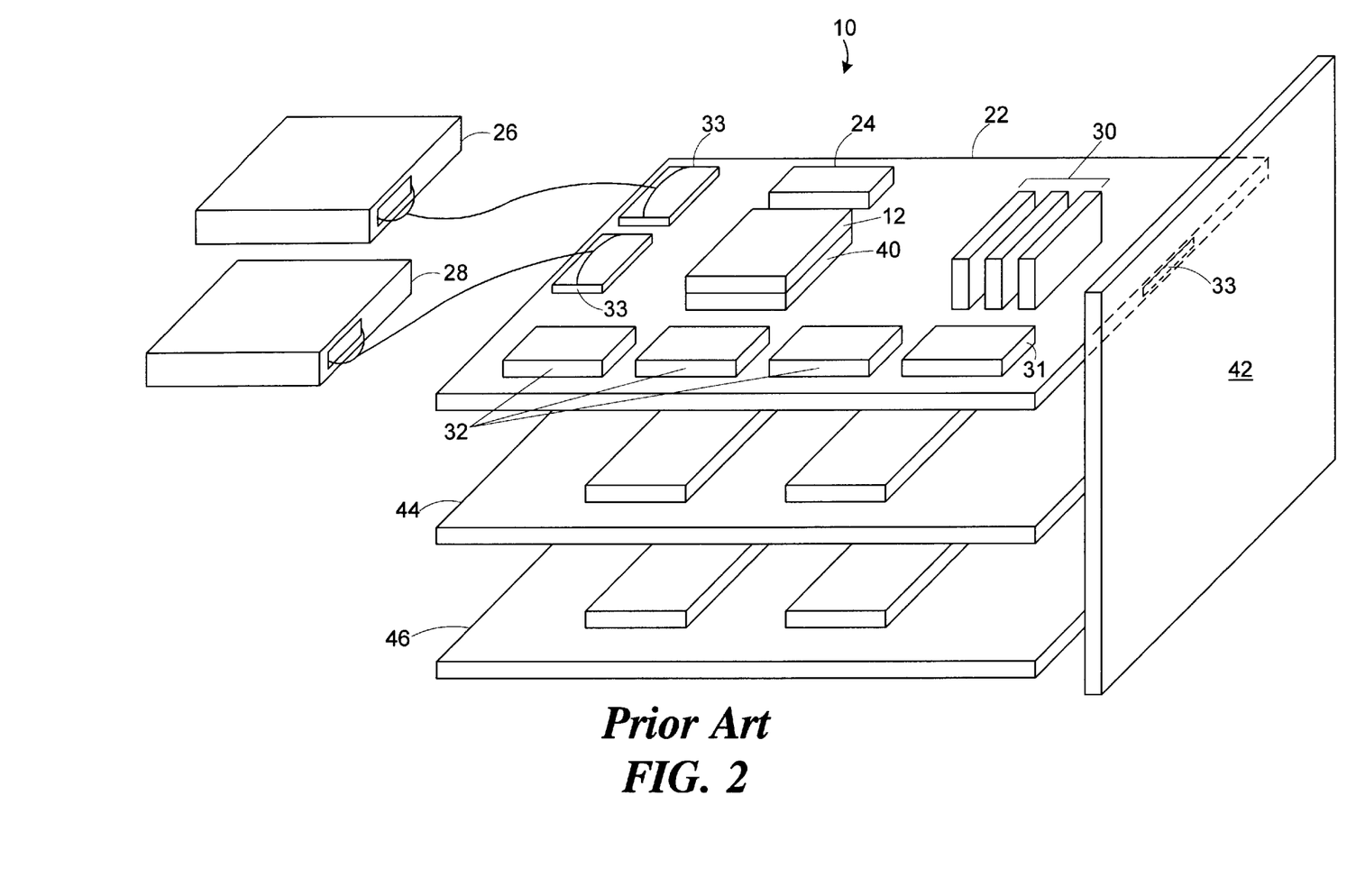
FIG. 2 is a schematic pictorial diagram of a portion of a prior art standard x86 processing system.

FIG. 2 is a schematic pictorial diagram of a portion of a standard x86 computer system 10. The system 10 includes the mother board 22 on which various system components, including the x86 microprocessor 12, DRAM 30, ROM 24, various peripheral circuits 32 and other miscellaneous circuitry 31 are mounted. The mother board 22 also provides various external interfaces 33 to the hard disk drive 26 and the CD ROM drive 28. Another external interface 33 is also provided via a pin connector to a system interface board 42. Other boards 44, 46 are interfaced to the mother board 22 via the system board 42. These other boards 44, 46, which can include a three-dimensional graphics acceleration board, a sound card, a multimedia card, etc., are interfaced to the mother board 22 via plug connectors mated with connectors on the system board 42.

The x86 microprocessor 12 is mounted to the mother board 22 by a plug-in socket 40, which is hard-mounted to the mother board 22. The pins in the bottom of the processor 12 mate with the pattern of pin sockets in the chip socket 40 such that the processor 12 can be readily removed from the socket 40 and replaced in the socket 40. The plug-in interface, translation and processing circuit of the invention is mechanically compatible with the standard socket 40 in which the standard x86 microprocessor is mounted. In one embodiment, it is implemented in the system 10 by removing the x86 microprocessor 12 and inserting the circuit of the invention into the socket 40.

Figure 3:
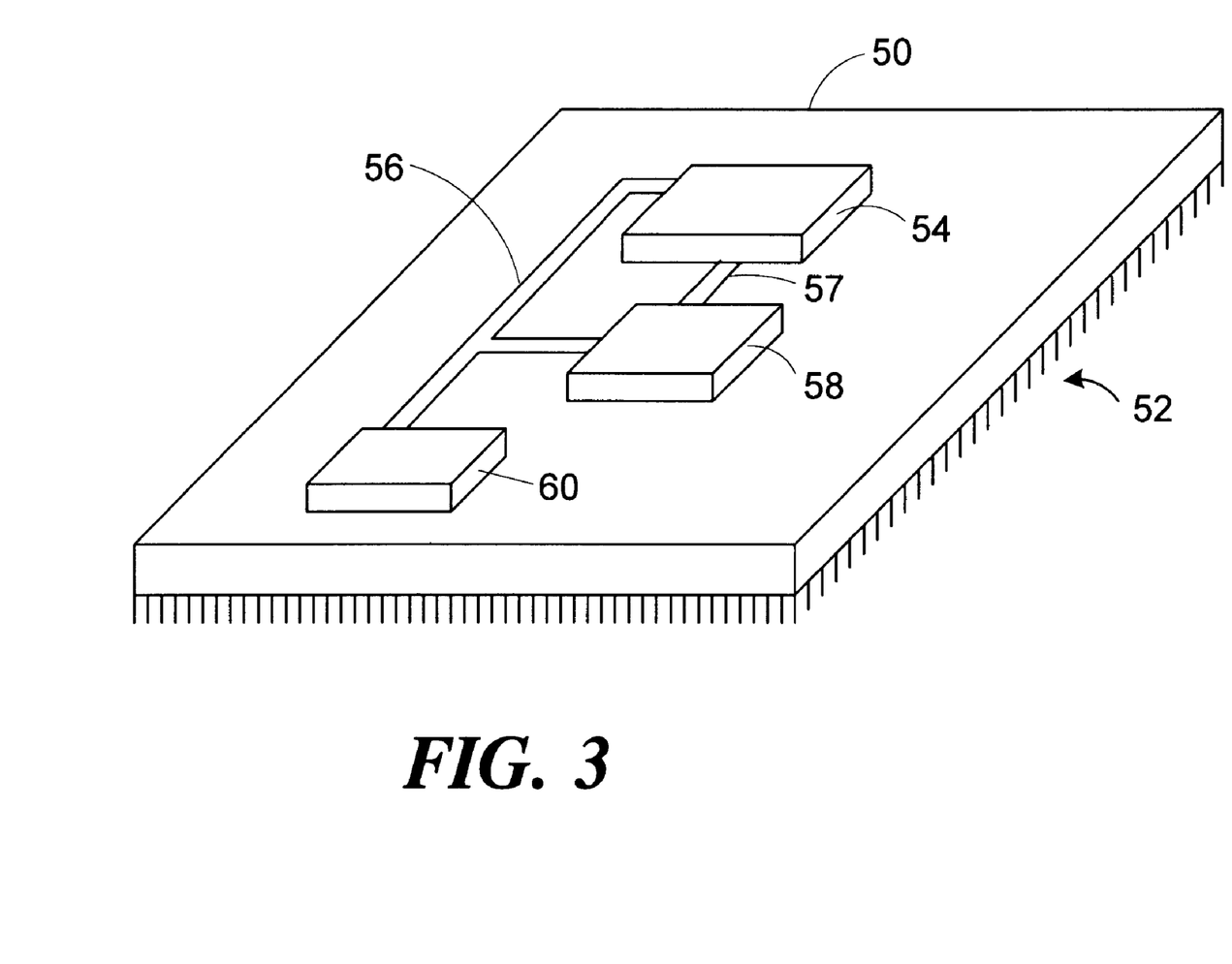
FIG. 3 is a schematic pictorial diagram of one embodiment of the plug-in circuit of the invention.

FIG. 3 is a schematic pictorial view of one embodiment of the plug-in circuit 50 of the invention. The circuit 50 includes a pattern of pins 52 at its lower surface which mate with the socket 40 in the standard x86 mother board 22. In general, the circuit 50 includes a RISC microprocessor 54 which, in one embodiment, is a DEC Alpha processor. It will be noted that throughout the description herein, the RISC processor and system are described in terms of the Alpha system. It will be understood that the Alpha system is only used as an example. The invention is applicable to other RISC systems also. The circuit 50 also includes a RISC (Alpha) bus 56, an optional instruction bus 57, a RISC backup cache 58 and a mapper/interface circuit 60 which performs the bus mapping and/or architecture mapping required to permit the Alpha microprocessor 54 to execute instructions from and/or otherwise interface with the standard x86 host hardware.

The circuit 50 can be a small printed circuit board (PCB) on which the circuits 54, 58 and 60 are mounted and on which are printed the various interconnections including the RISC bus 56. This "daughter" card plugs into the socket 40 on the mother board 22. Alternatively, the circuit 50 can be a multi-chip module (MCM) on which the circuits are mounted. The MCM can also plug into the socket 40 of the mother board 22.

Figure 4:
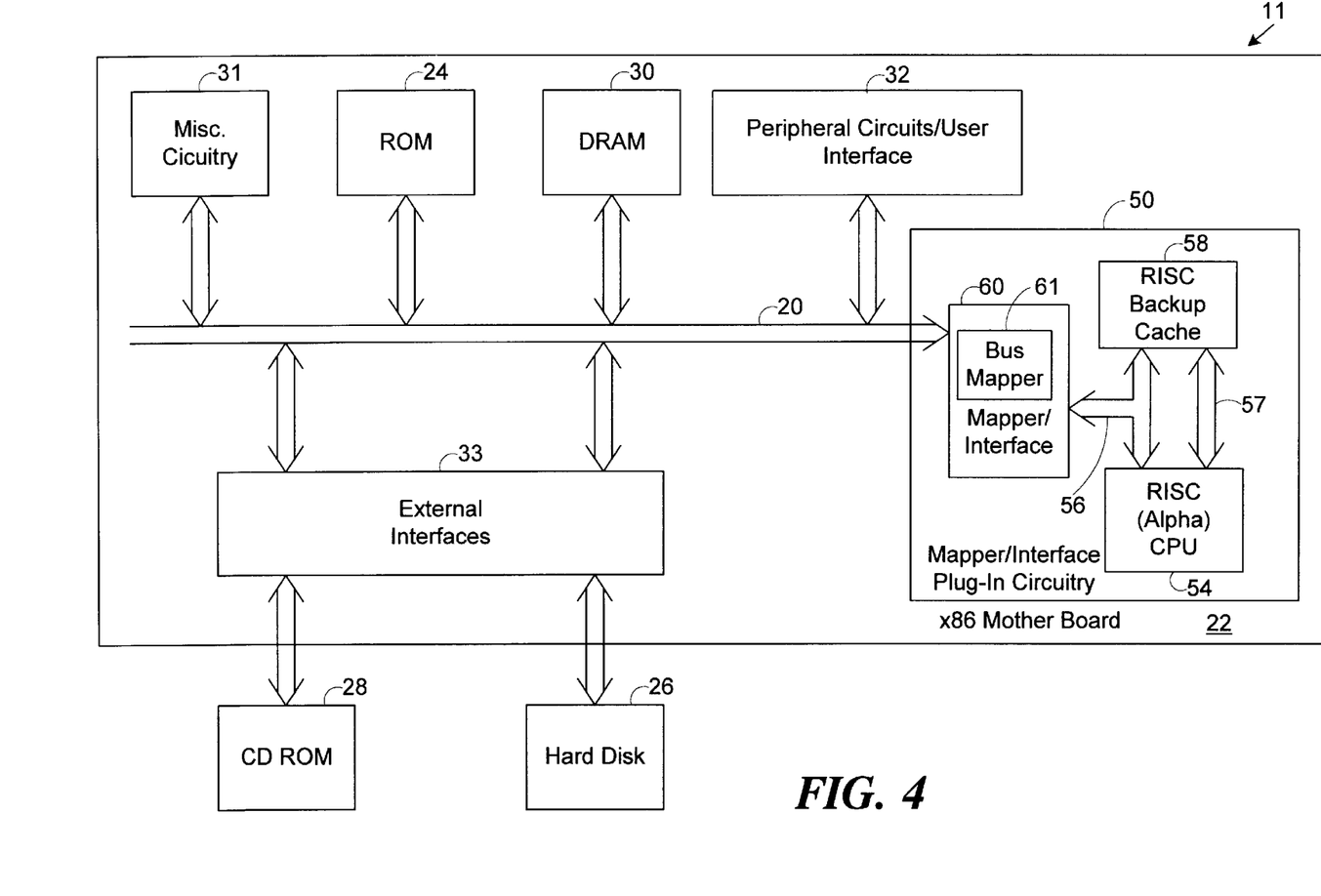
FIG. 4 is a schematic functional block diagram of one embodiment of the system of the invention using a bus mapper to map the RISC bus to the host CISC bus.

FIG. 4 is a schematic functional block diagram of the processing system 11 of the invention using the mapper/interface plug-in circuitry of the invention. As described above, the plug-in circuitry 50 plugs into the x86 socket 40 on the x86 standard mother board 22. The circuitry 50 includes the RISC (Alpha) CPU 54, the RISC backup cache 58 and the mapper/interface circuit 60. These devices are interfaced on the plug-in circuitry 50 by an internal RISC (Alpha) bus 56. An optional instruction bus 57 can also be included for transferring RISC instructions from the backup cache 58 to the CPU 54. The mapper/interface circuit 60 provides the interface between the Alpha bus 56 and the standard x86 bus 20.

In this embodiment of the invention, the mapper/interface circuit 60 provides a bus mapper 61 which provides physical mapping between the signals in the RISC system and those in the host x86 system. The bus mapping makes the plug-in circuitry 60 pin compatible with the x86 socket 40 of the mother board 22. However, in this embodiment, the RISC processor 54 is not binary compatible with the x86 system. That is, data and instructions translated on the system bus 20 in x86 compatible format are not translated to Alpha-compatible format by the mapper/interface 61. As a result, although the signals can be received at the plug-in circuitry 50, the data, instructions, and control words cannot be readily decoded and processed. In this embodiment, a software emulation program can be employed to translate the data, instruction, and control words into RISC or Alpha-compatible format such that they can be executed by the RISC (Alpha) CPU 54. As the x86 instructions are received, they are translated one at a time or emulated by the CPU 54 running the software emulation program stored on the hard disk drive 26. Translated RISC instructions can be stored temporarily in the backup cache 58 and then read from the cache 58 by the CPU 54 for execution. The instructions can be transferred to the CPU 54 via the RISC bus 56 or the optional instruction bus 57. This software emulation program is typically stored in the hard disk drive 26 and is transferred across the system x86 bus 20 to the plug-in circuitry 50 for execution. The emulation program can be read and processed by the Alpha CPU 54. The DEC FX!32 software is an example of a program that can perform x86 instruction emulation.

Figure 5:
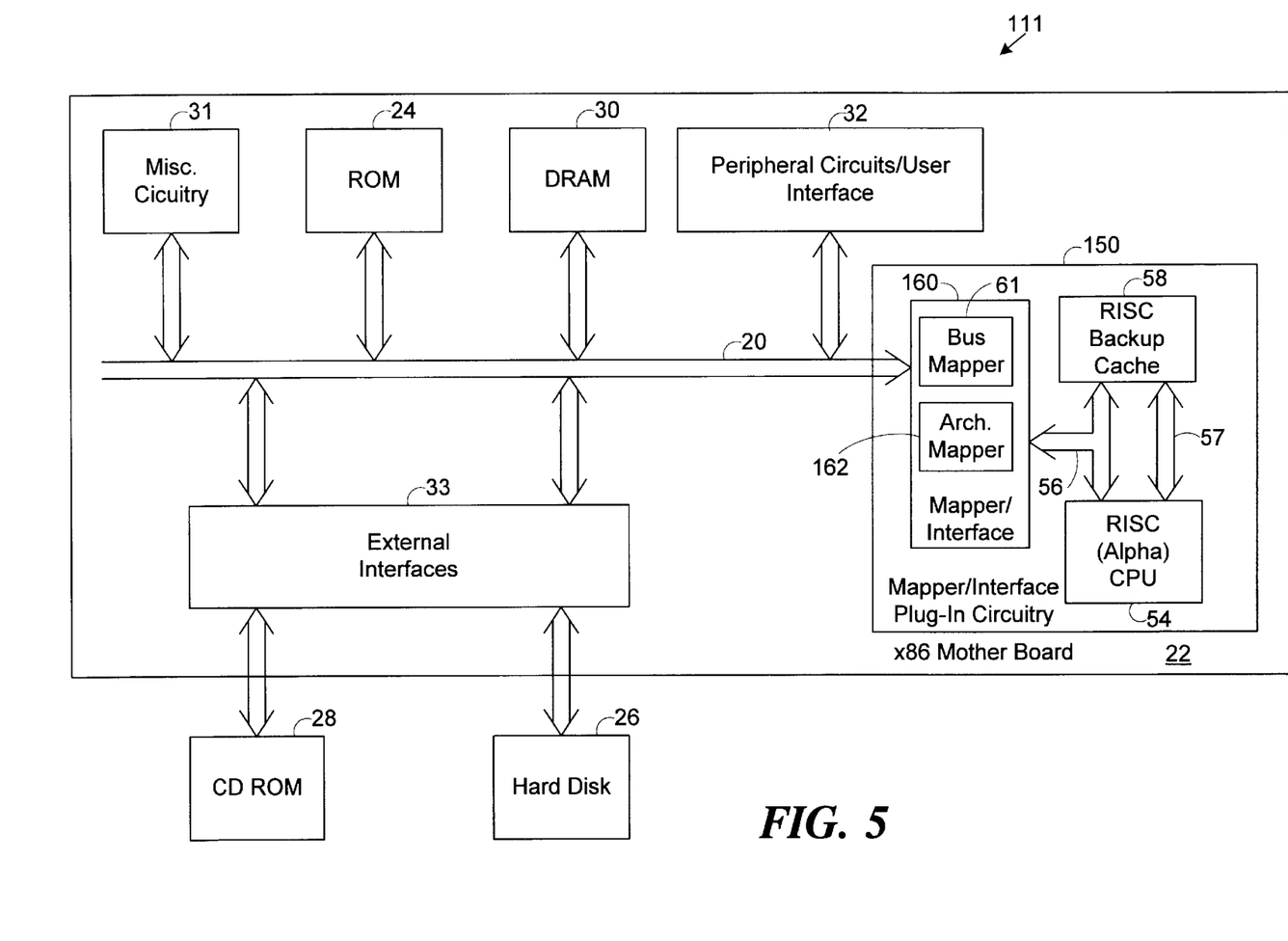
FIG. 5 is a schematic functional block diagram of another embodiment of the system of the invention using a bus mapper and an architecture mapper to interface the RISC microprocessor to the host CISC system.

FIG. 5 is a schematic block diagram of another embodiment 111 of the system of the invention which uses different mapper/plug-in circuitry 150 than that used in the embodiment of FIG. 4. In this embodiment, the plug-in circuitry 150 includes the RISC (Alpha) CPU 54, the RISC backup cache 58, the RISC bus 56 and the optional instruction bus 57 used in the previous embodiment shown in FIG. 4. However, in this embodiment, a different mapper/interface circuit 160 is used. In this embodiment, the mapper/interface circuit 160 includes the bus mapper 61 but also includes an architecture mapper 162 which translates x86 instructions to RISC instructions. In this case, the mapper/interface plug-in circuitry 150 is not only pin or plug compatible with the host x86 system. In addition, it is also binary compatible. That is, instructions are translated by the architecture mapper 162 such that instructions passed to the RISC backup cache 58 are in RISC-compatible format and, therefore, can be readily decoded and executed by the RISC CPU 54.

In this embodiment, x86 instructions are read from one of the memory devices 26, 28, 30 and are forwarded for execution along the x86 bus 20. The CISC x86 instructions are received at the architecture mapper 162 which translates the CISC x86 instructions to RISC instructions in accordance with the present invention and then forwards them to the RISC backup cache 58. As described above, the RISC (Alpha) CPU 54 reads the translated RISC instructions from the backup cache 58, and the instructions are forwarded to the processor over the RISC bus 56 or the optional instruction bus 57.

Figure 6:
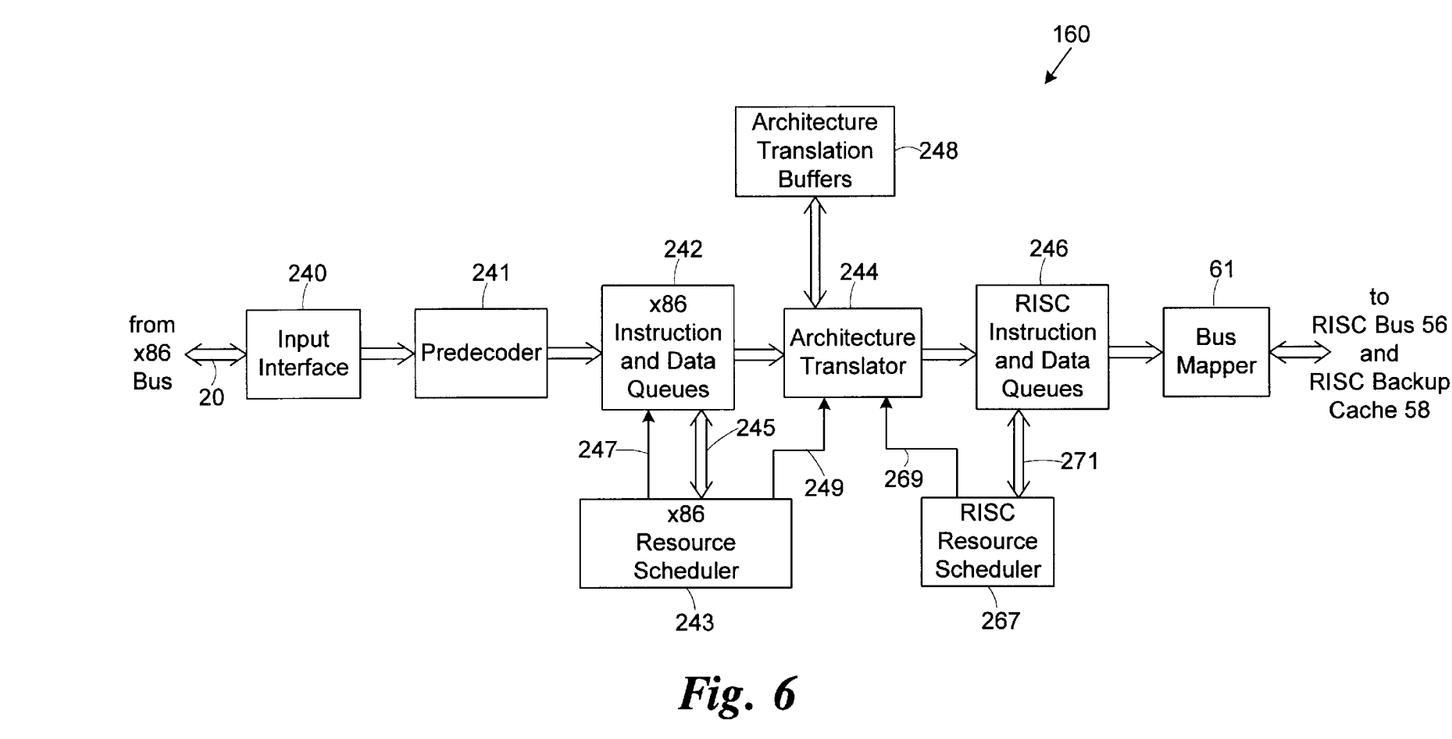
FIG. 6 is a schematic functional block diagram of one embodiment of the mapper/interface circuitry of the invention which uses both bus mapping and architecture mapping.

FIG. 6 is a detailed schematic functional block diagram of one embodiment of the mapper/interface circuit 160 of the invention used in the mapper/interface plug-in circuitry 150 shown in FIG. 5. The x86 bus 20 transmits x86 instructions, data and addresses from one of the memory devices 26, 28, 30. The instructions are received at an interface circuit 240. In one embodiment, the interface circuit 240 is adapted to interface with the standard x86 system hardware, such as the x86 system bus 20 on the standard x86 mother board 22. The x86 instructions are forwarded to a predecoder 241 which performs a partial decoding of the x86 instructions to identify them and optionally to identify the instruction data and address portions of the instructions. Among other functions, this predecoding can also be performed to map the x86 data, address and control formats to RISC formats which are compatible with the RISC environment.

The x86 instructions, data and addresses from the predecoder 241 are loaded into the x86 instruction and data queues 242. Instructions stored in the queues 242 are analyzed by an x86 resource scheduler 243 via an instruction bus 245. The resource scheduler 243 performs lexical analysis on the instructions to identify them. The lexical analysis performed by the scheduler 243 can identify instruction boundaries. A flag can then be inserted at each instruction boundary. After the instructions are identified and flagged, the resource scheduler 243 can perform further analysis on the instructions to identify blocks of instructions.

The beginning and end instructions of instruction blocks are identified to define instruction blocks. The blocks are defined as sets of instructions which are logically grouped together. For example, a block may be defined by the beginning and end instructions of a loop or a procedure. In one embodiment, these block, i.e., procedure or loop, boundaries are used to define groups of instructions which will be transferred to the architecture translator or mapper 244. Each group of instructions can include one or more blocks, i.e., loops, procedures, etc. The block boundary instructions at the beginning and end of an instruction group serve as group boundaries which define the end points of an instruction group. The boundaries are used since it is most efficient to group the instructions at the end points of instruction blocks. Depending upon the characteristics of the blocks, more than one block may be included in a single group of x86 instructions.

When a group of instructions is identified, control signals on lines 247 and 249 to the x86 instruction and data queues 242 and architecture translator 244, respectively, are activated to transfer the group of instructions to the architecture translator circuit 244. The group of instructions is then translated to associated RISC instructions. The translator 244 can also provide address, data and control functional mapping for each instruction as required such that the translated instructions can be readily executed in the RISC environment. A RISC resource scheduler 267 can also analyze translated RISC instructions stored in the RISC instruction and data queues 246 via a bus 271. When a group of translated instructions is ready to be transferred, the scheduler 267 notifies the architecture translator 244 via line 269 that a new group of translated instructions can be transferred to the RISC queues 246.

Depending on the instructions, the translated instructions may be forwarded to an appropriate architecture translation buffer in a set of buffers 248. These buffers 248 are used as needed depending on various functions being executed or modes in which the system is operating. In one embodiment, there are six different buffers, and each is described below.

The memory management translation buffer is used in tracing memory addresses. Due to the difference between the virtual and physical address tables used by the x86 processor and the Alpha processor, this buffer is used to trace addresses such that they are properly translated between x86 and Alpha formats. The instruction translation buffer is used to indicate whether a translation on a group of x86 instructions has been completed and also whether the translation is valid. It also contains information which identifies the location in which translated instructions are stored. The data translation buffer is used for translating data formats from the x86 data format to the Alpha data format, i.e., the CISC data format to the RISC data format. The interrupt and exception translation buffer records and traces any possible abnormal conditions that exist related to the x86 instructions presently being translated. These abnormal conditions can include interrupts. The emulation translation buffer is used to trace any x86 CISC instructions which are emulated in software instead of being translated to RISC instructions. Even though these instructions are not translated by the architecture translator 244, this buffer is still used to trace and track the progress of the emulation. The debugging support translation buffer is used to record and trace instructions related to execution of an x86 debugging feature.

The translated RISC instructions with data and addresses are transferred to the RISC instruction and data queues 246 which temporarily store the instructions. After the group of translated RISC instructions is transferred to the RISC instruction and data queues 246, the group of instructions can be transferred to the bus mapper 61. The bus mapper 61 can include circuitry used to map the pin signals of the translated RISC control, data and address words to the RISC bus 56. Next, the translated and mapped instructions and data are transferred to the RISC backup cache 58 via the RISC bus 56.

In one embodiment, certain modifications are made to the RISC Alpha CPU 54 to better accommodate the use of x86 CISC instructions. For example, in a standard RISC processor such as the Alpha or the Hewlett-Packard PA-RISC processor, words used in floating point arithmetic are typically 64 bits long. Thus, the standard floating point arithmetic unit in a standard RISC microprocessor is 64 bits wide, and the unit performs 64-bit arithmetic operations. However, x86 instructions typically use 80-bit floating point words. As a result, the standard x86 microprocessor floating point unit will perform 80-bit operations. Therefore, in one embodiment of the present invention, the RISC CPU 54 is modified to include an 80-bit floating point unit to perform arithmetic operations directly on the x86 data words.

In addition, the RISC CPU 54 used in the circuitry 150 of the invention can also have a slightly modified instruction mapper compared to the standard instruction mapper used in a standard RISC microprocessor. The instruction mapper is used to keep track of instruction addresses and offsets to ensure correct sequential accessing of instructions. Because of the difference between the 64-bit floating point words used in a standard RISC system and the 80-bit floating point words used in an x86 system, differences in address offsets and instruction cycles can result, possibly causing incorrect sequencing of instruction execution. In one embodiment of the invention, the instruction mapper in the RISC CPU 54 is modified to accommodate the 80-bit floating point words of the standard x86 system to ensure that the instruction mapper correctly controls instruction execution.

Figure 7:
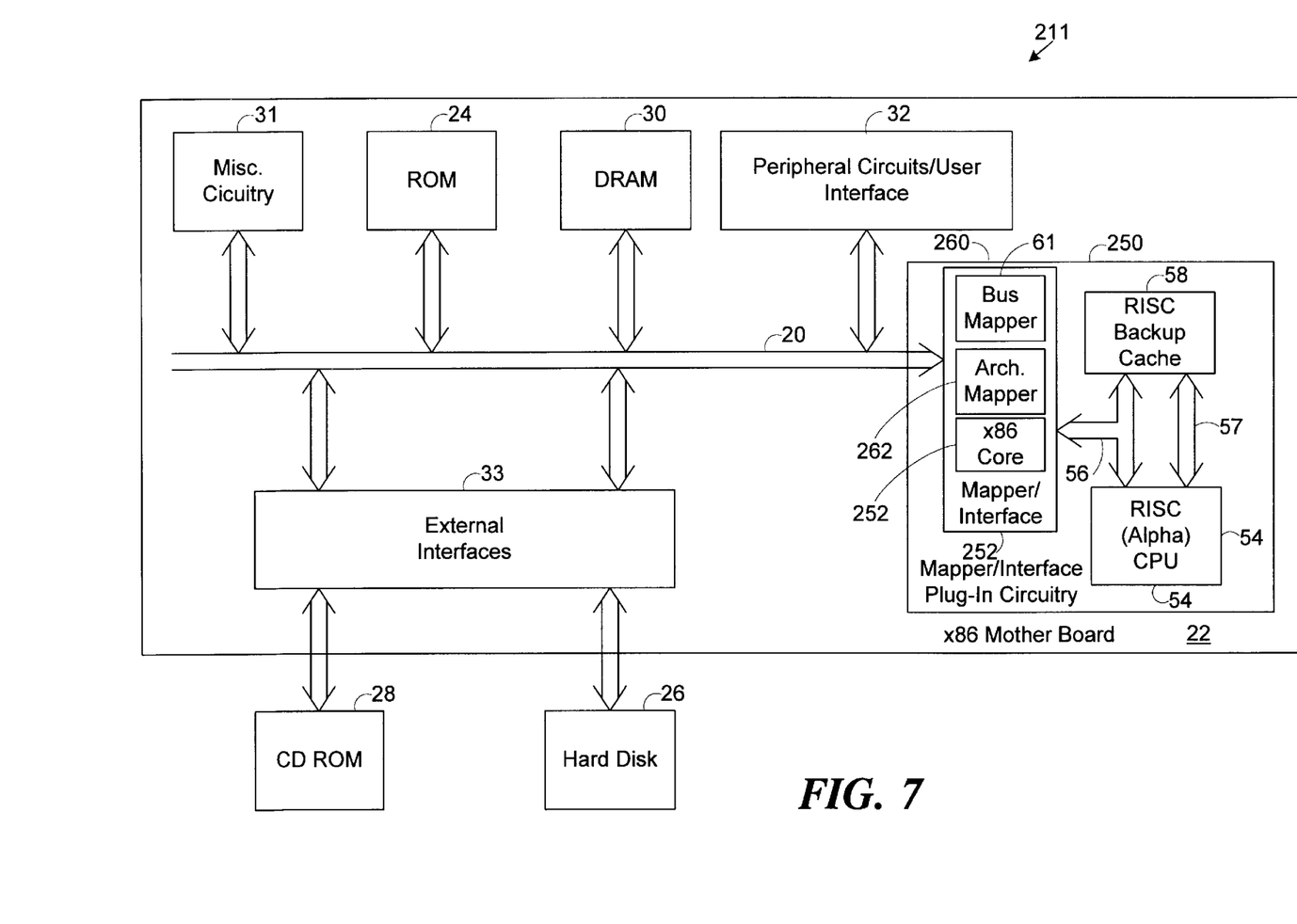
FIG. 7 is a schematic functional block diagram of another embodiment of the system of the invention using a bus mapper, an architecture mapper and an x86 core ASIC to interface the RISC microprocessor to the host CISC system.

FIG. 7 is a schematic functional block diagram of another embodiment 211 of the system of the invention. In this embodiment, the mapper/interface plug-in circuitry 250 includes a different mapper/interface circuit 260 than those in the previous embodiments. In this embodiment, the mapper/interface circuit 260 includes the bus mapper 61 which makes the plug-in circuitry 250 pin or plug compatible with the x86 system. The architecture mapper 262 is also included such that the systems are binary compatible, as described above in connection with FIGS. 5 and 6. The embodiment of FIG. 7 adds an x86 core ASIC microprocessor 252 on the mapper/interface circuit 260. The x86 core ASIC 252 is used to execute certain x86 instructions which are passed directly to the ASIC 252 instead of to the architecture mapper 262 for translation. In one embodiment, the relatively simple x86 instructions are executed by the x86 core ASIC 252. These instructions are generally 8-bit and 16-bit applications which are executed in one of three x86 system modes, namely, a real-address mode, a virtual 8086 mode and a system management mode. When the system mode changes to a protected mode, typically, more complicated 32-bit x86 instructions are involved. These instructions are forwarded to the architecture mapper 262 for translation to RISC instructions in a fashion similar to that described above in connection with FIGS. 5 and 6.

Figure 8:
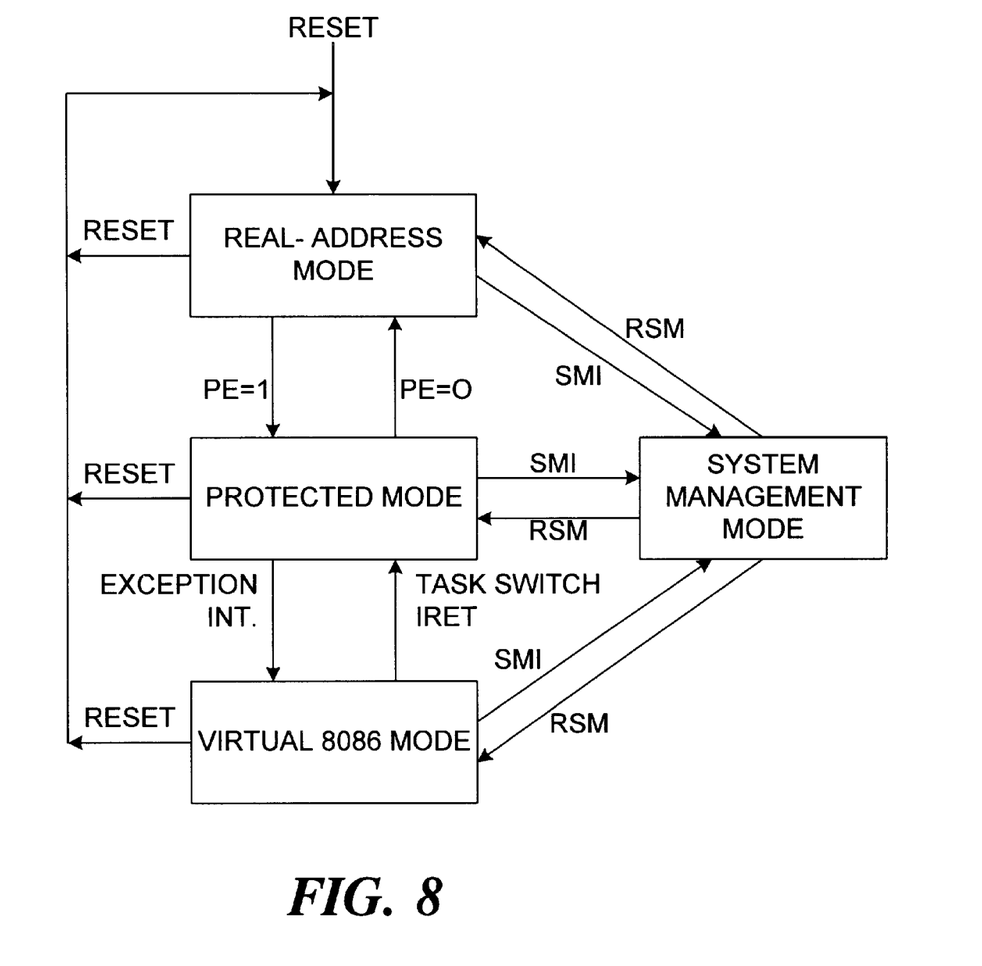
FIG. 8 is a schematic flow diagram which schematically illustrates the logical flow of transitions between various x86 processing modes.

The system switches between modes by setting and resetting flags, in general. In one embodiment a Protect Enable (PE) bit controls transfer into and out of the x86 protected mode in which the architecture mapper 262 is implemented. FIG. 8 is a schematic flow diagram which schematically illustrates the logical flow of system transitions between the various x86 processing modes. As shown in the figure, at power-on, flow enters the real-address mode. When PE is set, i.e., when PE=1, instruction flow passes from the real-address mode into the protected mode. All x86 core process context is stored, and translation of instructions begins from the context point. When PE is returned to an inactive state, i.e., when PE=0, flow returns to the real-address mode from the protected mode. Translation ends and the x86 core process context is restored. Execution by the x86 core ASIC 252 resumes. In one embodiment, both the x86 core ASIC microprocessor 252 and the architecture mapper 262 contain a status register that keeps track of the state of PE to control the flow into and out of the protected mode. The architecture mapper 262 can also monitor the x86 instructions to identify the instruction pattern used to switch into and out of the protected mode to identify when a mode switch is about to take place.

Flow can also pass into and out of the protected mode from the system management mode and/or the virtual 8086 mode. While in the protected mode, if an Exception Interrupt is received, flow passes to the virtual 8086 mode. Flow passes back to the protected mode via a task switch interrupt return. Flow passes into the system management mode via system management interrupt (SMI). Flow passes back to the mode from which it was interrupted via a resume (RSM).

Figure 9:
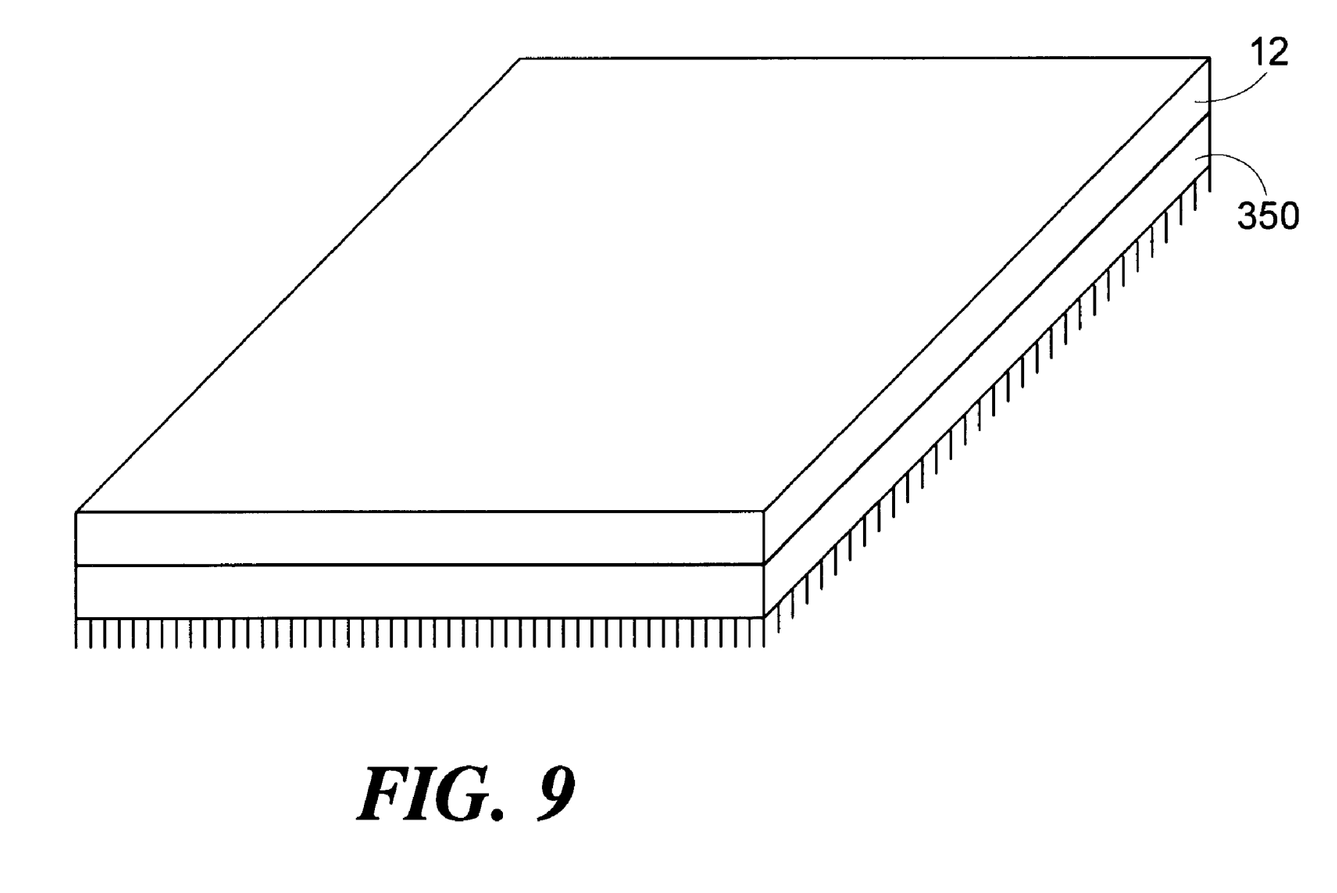
FIG. 9 is a schematic pictorial diagram of another embodiment of the plug-in circuit of the invention in which an x86 microprocessor plugs into the circuit of the invention.

FIG. 9 is a schematic pictorial diagram of another alternative embodiment of the mapper/interface plug-in circuitry 350 of the invention. In this embodiment, the plug-in circuitry 350 is formed with a series of socket holes which is compatible with the pins on the bottom of a standard x86 processor 12. As a result, the standard x86 processor 12 can be inserted into the top of the mapper/interface plug-in circuitry 350.

Figure 10:
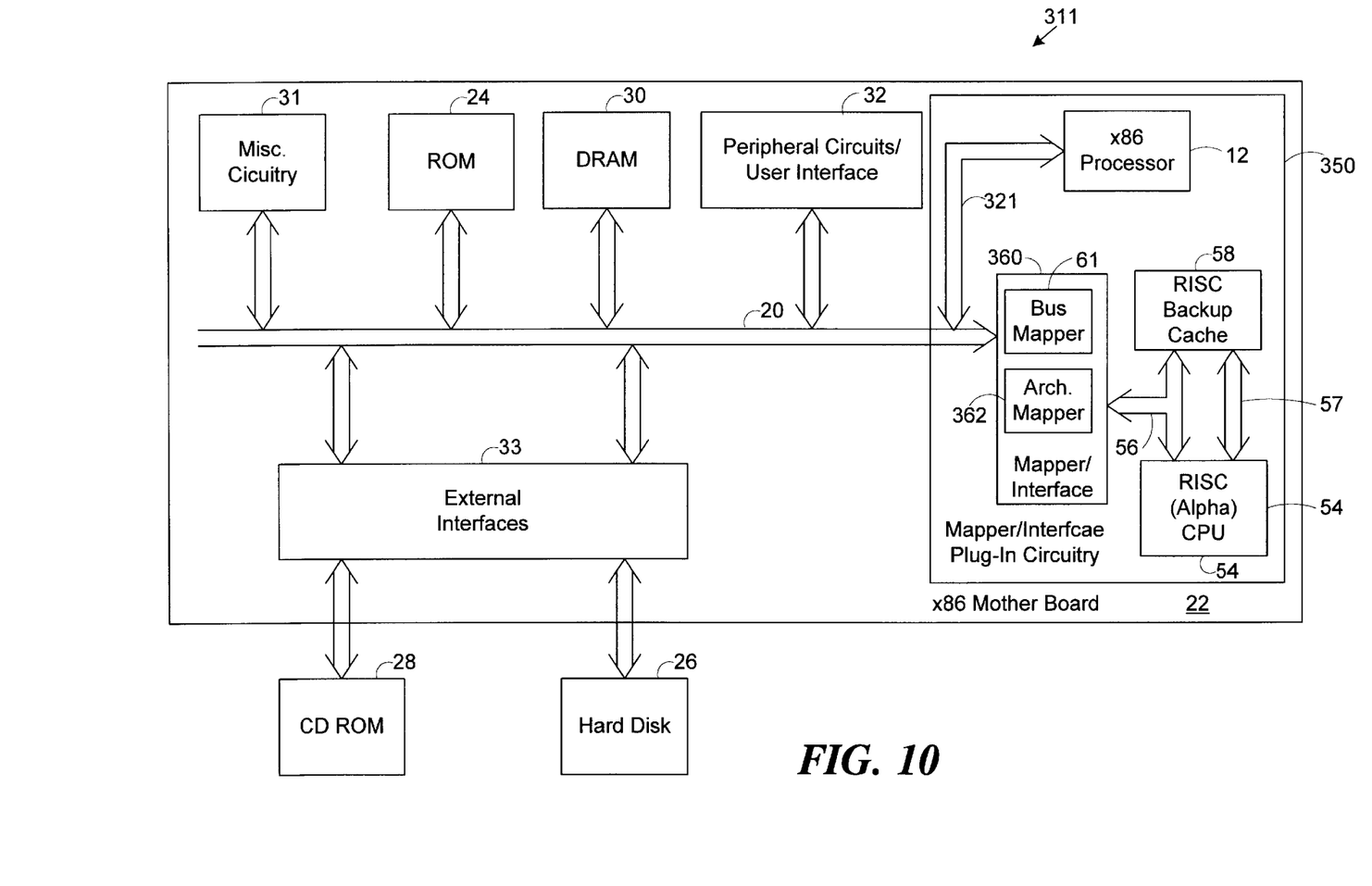
FIG. 10 is a schematic functional block diagram of another embodiment of the system of the invention using the plug-in circuit configuration of FIG. 8.

FIG. 10 is a schematic functional block diagram of the embodiment 311 of the system of the invention which uses the mapper/interface plug-in circuitry 350 of FIG. 8. As shown in FIG. 9, the plug-in circuitry 350 can include the RISC (Alpha) CPU 54, the RISC backup cache 58, the RISC bus 56 and the optional instruction bus 57. The mapper/interface 360 provides bus mapping 61 and architecture mapping 362 as described above to provide pin-to-pin plug compatibility as well as binary compatibility between the RISC system and the x86 host system. In addition, the plug-in circuitry 350 provides an interface between the x86 processor 12 and the x86 bus 20 via an internal interface bus 321. Essentially, this internal interface bus 321 is a direct pin mapping between the pins in the x86 processor 12 and a set of sockets in the top of the mapper/interface plug-in circuitry 350. When the x86 processor 12 is plugged into the mapper/interface plug-in circuitry 350, the x86 processor 12 has direct access to the x86 system bus 20 via the internal bus 321.

The system 311 of FIG. 10 operates in a fashion similar to the embodiment of FIG. 7. The x86 processor 12 is used to execute x86 instructions directly without the need for bus mapping or architecture mapping. The instructions executed directly by the x86 processor 12 are typically those executed in modes other than the protected mode of the x86 system. As described above in connection with the embodiment of FIG. 7, the mapper/interface circuitry 360 is implemented to provide bus and architecture mapping when the system operates in the x86 protected mode.

Hence, the present invention provides the capability of executing CISC instructions on a RISC microprocessor. The invention translates the CISC instructions, which can be x86 instructions, to compatible RISC instructions which can be executed on a RISC microprocessor which is only slightly modified. The plug-in interface circuitry of the invention is plug-in compatible with standard x86 hardware such as standard commercially available x86 mother boards. This bus-to-bus compatibility allows the system to be developed using standard off-the-shelf hardware which can be substantially less expensive than more complex RISC hardware which is generally custom designed and manufactured to the specific RISC microprocessor being used. The architecture mapping of the invention, in addition to translating instructions between CISC and RISC formats, also updates and maintains address mapping between the CISC and RISC formats, and also keeps and maintains data mapping between the two formats. This provides complete compatibility between the systems such that the system of the invention is transparent to an existing x86 environment. The system of the invention can be plugged into an existing x86 hardware platform with almost no modification required.

Translations are done efficiently in the present invention by using the software boundaries which, in one embodiment, can be determined by analysis of the input CISC instructions to identify loop boundaries. Translation can be performed on groups of instructions such that while one group has been translated and is being executed, a next group of CISC instructions can be provided to the interface circuit for translation. In this way, down time of the microprocessor is minimized. Alternatively, instructions can also be translated and executed one at a time such as was done in prior systems.

In one embodiment of the invention, the system can also process RISC instructions provided to the system. In this mode, RISC instructions are directly forwarded to the RISC backup cache via the x86 bus where they can be executed by the RISC microprocessor. Therefore, programs having both types of instruction can be executed by the same single RISC microprocessor. To implement this feature, the system of the invention can execute a customized instruction which switches the mode back and forth between the RISC instruction input mode and the CISC instruction input mode. In one embodiment, this "SYNC" instruction can switch to the RISC mode from the x86 mode when a new RISC input instruction is received. If an x86 instruction is received for execution while in the RISC mode, the SYNC instruction can switch the mode back to x86 mode.

While this invention has been particularly shown and described with references to preferred embodiments thereof, it will be understood by those skilled in the art that various changes in form and details may be made therein without departing from the spirit and scope of the invention as defined by the following claims.

What is claimed is:

1. An interface circuit for providing an interface to a separate microprocessor integrated circuit, said microprocessor integrated circuit executing instructions of a first instruction set and said interface circuit being separate from said microprocessor integrated circuit, said interface circuit comprising:

an input interface for receiving instructions of a second instruction set, said second instruction set being a complex instruction set computer (CISC) instruction set;

a translator circuit for receiving instructions of the second instruction set from the input interface and translating the received instructions of the second instruction set to associated instructions of the first instruction set; and an output interface over which the translated instructions of the first instruction set are transmitted from the interface circuit to the separate microprocessor integrated circuit.

2. The interface circuit of claim 1 wherein the first instruction set is a reduced instruction set computer (RISC) instruction set.

3. The interface circuit of claim 1 wherein the second instruction set comprises x86 instructions.

4. The interface circuit of claim 3 wherein the instructions of the second instruction set comprise x86 object codes.

5. The interface circuit of claim 1 further comprising a first instruction queue for storing a group of instructions of the first instruction set before they are translated.

6. The interface circuit of claim 5 wherein the group of instructions of the first instruction set is transferred to the translator circuit together.

7. The interface circuit of claim 5 further comprising a circuit coupled to the first instruction queue for analyzing the instructions stored in the first instruction queue to define boundaries of the group of instructions of the first instruction set.

8. The interface circuit of claim 5 wherein the first instruction queue transmits the group of instructions of the first instruction set to the translator circuit.

9. The interface circuit of claim 5 further comprising a second translated instruction queue for storing a group of translated instructions of the first instruction set before they are transmitted to the microprocessor integrated circuit.

10. The interface circuit of claim 9 wherein a second group of translated instructions is stored in the second translated instruction queue while the first group of translated instructions is executed by the microprocessor integrated circuit.

11. The interface circuit of claim 1 further comprising a mapper circuit for mapping signals associated with the second instruction set to signals associated with the first instruction set.

12. The interface circuit of claim 1 wherein the input interface provides an interface to standard x86-compatible hardware.

13. The interface circuit of claim 12 wherein the standard x86-compatible hardware includes a standard x86-compatible mother board.

14. The interface circuit of claim 1 further comprising a plurality of pins which are compatible with a socket in which a processor associated with the second instruction set is insertable during operation with the second instruction set.

15. A processing system comprising:

a microprocessor integrated circuit for executing instructions of a first instruction set; and an interface circuit separate from said microprocessor integrated circuit for providing an interface to the microprocessor integrated circuit, said interface circuit comprising:

an input interface for receiving instructions of a second instruction set, said second instruction set being a complex instruction set computer (CISC) instruction set, a translator circuit for receiving instructions of the second instruction set from the input interface and translating the received instructions of the second instruction set to associated instructions of the first instruction set, and an output interface over which the translated instructions of the first instruction set are transmitted to the separate microprocessor integrated circuit.

16. The processing system of claim 15 wherein the first instruction set is a reduced instruction set computer (RISC) instruction set.

17. The processing system of claim 15 wherein the second instruction set comprises x86 instructions.

18. The processing system of claim 15 further comprising a first instruction queue for storing a group of instructions of the first instruction set before they are translated.

19. The processing system of claim 18 wherein the group of instructions of the first instruction set is transferred to the translator circuit together.

20. The processing system of claim 18 further comprising a circuit coupled to the first instruction queue for analyzing the instructions stored in the first instruction queue to define boundaries of the group of instructions of the first instruction set.

21. The processing system of claim 18 wherein the first instruction queue transmits the group of instructions of the first instruction set to the translator circuit.

22. The processing system of claim 18 further comprising a second translated instruction queue for storing a group of translated instructions of the first instruction set before they are transmitted to the microprocessor integrated circuit.

23. The processing system of claim 22 wherein a second group of translated instructions is stored in the second translated instruction queue while the first group of translated instructions is executed by the microprocessor integrated circuit.

24. The processing system of claim 15 further comprising a mapper circuit for mapping signals associated with the second instruction set to signals associated with the first instruction set.

25. The processing system of claim 15 wherein the input interface provides an interface to standard x86-compatible hardware.

26. The processing system of claim 25 wherein the standard x86-compatible hardware includes a standard x86-compatible mother board.

27. The processing system of claim 15 wherein the interface circuit further comprises a plurality of pins which are compatible with a socket in which a processor associated with the second instruction set is insertable during operation with the second instruction set.

28. A circuit for processing instructions of a first instruction set in a system adapted to process instructions of a second instruction set, said system comprising a system hardware interface adapted to be connected to a processor associated with the second instruction set, the system hardware interface including a socket connector mounted on a printed circuit board and having a pluggable conductor pattern compatible with the processor associated with the second instruction set such that the processor associated with the second instruction set is able to be plugged into the socket connector, said circuit comprising:

a circuit hardware interface that is physically compatible with the system hardware interface, the circuit hardware interface comprising a pluggable conductor pattern compatible with the socket connector mounted on the printed circuit board such that the circuit hardware interface is able to be plugged into the socket connector; and an interface circuit for interfacing a second processor associated with the first instruction set to the system such that the second processor receives and sends signals via the circuit hardware interface.

29. The circuit of claim 28 wherein the system adapted to process instructions of a second instruction set is a CISC system.

30. The circuit of claim 28 wherein the system adapted to process instructions of a second instruction set is an x86-compatible system.

31. The circuit of claim 28 wherein the socket connector is pin compatible with an x86 microprocessor.

32. The circuit of claim 28 wherein the printed circuit board is a standard x86 mother board.

33. The circuit of claim 28 wherein the first instruction set is a reduced instruction set computer (RISC) instruction set.

34. The circuit of claim 33 wherein the second instruction set is a complex instruction set computer (CISC) instruction set.

35. The circuit of claim 34 wherein the second instruction set comprises x86 instructions.

36. The circuit of claim 28 wherein the second instruction set is a complex instruction set computer (CISC) instruction set.

37. The circuit of claim 36 wherein the second instruction set comprises x86 instructions.

38. The circuit of claim 28 further comprising a bus mapper circuit for mapping signals associated with the second instruction set to signals associated with the first instruction set.

39. The circuit of claim 28 further comprising an architecture mapper circuit for mapping instructions of the second instruction set to instructions of the first instruction set.

40. The circuit of claim 39 wherein the architecture mapper comprises an instruction translator for translating instructions of the second instruction set to instructions of the first instruction set.

41. The circuit of claim 39 wherein the architecture mapper comprises an x86 core microprocessor for executing instructions of the second instruction set.

42. A method of executing instructions in a processing system, comprising:

providing a microprocessor integrated circuit for executing instructions of a first instruction set;

providing an interface circuit separate from said microprocessor integrated circuit;

with the interface circuit, receiving instructions of a second instruction set, said second instruction set being a complex instruction set computer (CISC) instruction set;

with the interface circuit, translating the received instructions of the second instruction set to associated instructions of the first instruction set; and transmitting the translated instructions of the first instruction set to the separate microprocessor integrated circuit.

43. The method of claim 42 wherein the first instruction set is a reduced instruction set computer (RISC) instruction set.

44. The method of claim 42 wherein the second instruction set comprises x86 instructions.

45. The method of claim 42 further comprising providing a first instruction queue for storing a group of instructions of the first instruction set before they are translated.

46. The method of claim 45 wherein the group of instructions of the first instruction set is transferred to the translator circuit together.

47. The method of claim 45 further comprising analyzing the instructions stored in the first instruction queue to define boundaries of the group of instructions of the first instruction set.

48. The method of claim 45 wherein the first instruction queue transmits the group of instructions of the first instruction set to the translator circuit.

49. The method of claim 45 further comprising providing a second translated instruction queue for storing a group of translated instructions of the first instruction set before they are transmitted to the microprocessor integrated circuit.

50. The method of claim 49 wherein a second group of translated instructions is stored in the second translated instruction queue while the first group of translated instructions is executed by the microprocessor integrated circuit.

51. The method of claim 42 further comprising mapping signals associated with the second instruction set to signals associated with the first instruction set.

52. The method of claim 42 wherein instructions of the second instruction set are received from standard x86-compatible hardware.

53. The method of claim 52 wherein the standard x86-compatible hardware includes a standard x86-compatible mother board.

54. An interface circuit for providing an interface to a separate microprocessor integrated circuit, said microprocessor integrated circuit executing instructions of a first instruction set and said interface circuit being separate from said microprocessor integrated circuit, said interface circuit comprising:

an input interface for receiving instructions of a second instruction set;

a translator circuit for receiving instructions of the second instruction set from the input interface and translating the received instructions of the second instruction set to associated instructions of the first instruction set;

an output interface over which the translated instructions of the first instruction set are transmittable from the interface circuit to the separate microprocessor integrated circuit;

a first instruction queue for storing a group of instructions of the first instruction set before said group of instructions of the first instruction set is translated; and a second translated instruction queue for storing a group of translated instructions of the first instruction set before said group of translated instructions is transmitted to the microprocessor integrated circuit.

55. The interface circuit of claim 54 wherein a second group of translated instructions is stored in the second translated instruction queue while the first group of translated instructions is executed by the microprocessor integrated circuit.

56. A processing system comprising:

a microprocessor integrated circuit for executing instructions of a first instruction set; and an interface circuit separate from said microprocessor integrated circuit for providing an interface to the microprocessor integrated circuit, said interface circuit comprising:

an input interface for receiving instructions of a second instruction set, a translator circuit for receiving instructions of the second instruction set from the input interface and translating the received instructions of the second instruction set to associated instructions of the first instruction set, an output interface over which the translated instructions of the first instruction set are transmittable to the separate microprocessor integrated circuit, a first instruction queue for storing a group of instructions of the first instruction set before said group of instructions of the first instruction set is translated; and a second translated instruction queue for storing a group of translated instructions of the first instruction set before said group of translated instructions is transmitted to the microprocessor integrated circuit.

57. The processing system of claim 56 wherein a second group of translated instructions is stored in the second translated instruction queue while the first group of translated instructions is executed by the microprocessor integrated circuit.

58. A method executing instructions in a processing system, comprising:

providing a microprocessor integrated circuit for executing instructions of a first instruction set;

providing an interface circuit separate from said microprocessor integrated circuit;

with the interface circuit, receiving instructions of a second instruction set;

with the interface circuit, translating the received instructions of the second instruction set to associated instructions of the first instruction set;

transmitting the translated instructions of the first instruction set to the separate microprocessor integrated circuit;

providing a first instruction queue for storing a group of instructions of the first instruction set before said group of instructions of the first instruction set is translated; and providing a second translated instruction queue for storing a group of translated instructions of the first instruction set before said group of translated instructions is transmitted to the microprocessor integrated circuit.

59. The method of claim 58 wherein a second group of translated instructions is stored in the second translated instruction queue while the first group of translated instructions is executed by the microprocessor integrated circuit.

60. A processing system comprising:

a microprocessor integrated circuit for executing instructions of a first instruction set; and an interface circuit separate from said microprocessor integrated circuit for providing an interface to the microprocessor integrated circuit during the execution of the first instruction set by the microprocessor integrated circuit, said interface circuit comprising:

an input interface for receiving instructions of a second instruction set;

a translator circuit for receiving instructions of the second instruction set from the input interface and temporarily storing said second instruction set before translating the stored instructions of the second set to associated instructions of the first instruction set; and a memory, responsive to the translator circuit for temporarily storing the translated instructions and transmitting the translated instructions to an output interface over which the translated instructions are transmitted to the separate microprocessor integrated circuit.

* * * * *